United States Patent
Mossoba et al.

(10) Patent No.: US 10,873,662 B2
(45) Date of Patent: *Dec. 22, 2020

(54) IDENTIFYING A MEDIA ITEM TO PRESENT TO A USER DEVICE VIA A COMMUNICATION SESSION

(71) Applicant: Capital One Services, LLC, McLean, VA (US)

(72) Inventors: Michael Mossoba, Arlington, VA (US); Joshua Edwards, Philadelphia, PA (US); Abdelkadar M'Hamed Benkreira, Washington, DC (US); Alexandra Colevas, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/789,583

(22) Filed: Feb. 13, 2020

(65) Prior Publication Data

US 2020/0252505 A1 Aug. 6, 2020

Related U.S. Application Data

(63) Continuation of application No. 16/523,107, filed on Jul. 26, 2019, which is a continuation of application
(Continued)

(51) Int. Cl.
*H04M 3/428* (2006.01)
*H04M 3/523* (2006.01)
(Continued)

(52) U.S. Cl.
CPC .......... *H04M 3/4285* (2013.01); *G06N 20/00* (2019.01); *H04M 3/5238* (2013.01); *H04N 21/251* (2013.01)

(58) Field of Classification Search
CPC .. H04M 3/4285; H04M 3/5238; H04M 3/428; H04M 3/436; G06N 20/00; H04N 21/251
(Continued)

(56) References Cited

U.S. PATENT DOCUMENTS 6,751,306 B2 6/2004 Himmel et al.
9,596,347 B2 3/2017 Ronketti et al.
(Continued)

OTHER PUBLICATIONS

Apple's Hold Music, and Apple Care+ Procedure, Jun. 2016, 2 pages. Retrieved from Internet:[URL:http://appleause.com/2016/06/02/apples-hold-music-and-apple-care-procedure/].
(Continued)

*Primary Examiner* — Thjuan K Addy
(74) *Attorney, Agent, or Firm* — Harrity & Harrity, LLP

(57) ABSTRACT

A device communicates with a user device via a communication session, determines user information relating to the user device or a user of the user device, and determines that the user device is placed on a hold status. The device determines, using a machine learning model, a type of media item to be presented to the user device, where the machine learning model has been trained to identify types of media items to present to user devices when the user devices are placed in the hold status, and selects a media item corresponding to the type of media item. The device presents the media item to the user device via the communication session, determines that the user device is no longer placed on the hold status, and causes the media item to cease being presented.

20 Claims, 8 Drawing Sheets

100

Related U.S. Application Data

No. 16/268,923, filed on Feb. 6, 2019, now Pat. No. 10,419,607.

(51) Int. Cl.
*G06N 20/00* (2019.01)
*H04N 21/25* (2011.01)

(58) Field of Classification Search
USPC ............ 379/215.01, 211.01, 201.01, 265.01,
379/265.05, 242, 265.09, 88.01
See application file for complete search history.

(56) References Cited

U.S. PATENT DOCUMENTS

| | | |
|---|---|---|
| 10,419,607 B1 | 9/2019 | Mossoba et al. |
| 2003/0161464 A1 | 8/2003 | Rodriguez et al. |
| 2007/0047711 A1 | 3/2007 | Florkey et al. |
| 2014/0140494 A1 | 5/2014 | Zhakov |
| 2018/0063329 A1* | 3/2018 | Mitchell ............. H04M 3/5191 |
| 2018/0191905 A1 | 7/2018 | McCoy |
| 2019/0037077 A1 | 1/2019 | Konig et al. |

OTHER PUBLICATIONS

Co-pending U.S. Appl. No. 16/523,107, filed Jul. 26, 2019.

* cited by examiner

IDENTIFYING A MEDIA ITEM TO PRESENT TO A USER DEVICE VIA A COMMUNICATION SESSION

RELATED APPLICATIONS

This application is a continuation of U.S. patent application Ser. No. 16/523,107, filed Jul. 26, 2019, which is a continuation of U.S. patent application Ser. No. 16/268,923, filed Feb. 6, 2019 (now U.S. Pat. No. 10,419,607), which are incorporated herein by reference.

BACKGROUND

A user can call, via a user device, a telephone number of an organization to interact with an interactive voice response system (IVR) and/or customer service representative of the organization. The IVR and/or customer service representative may cause, when interacting with the user, the user device to be placed on a hold status. One or more media items, such as "hold music" chosen by the organization, may be presented to the user device while the user device is placed on the hold status.

SUMMARY

According to some implementations, a device may include one or more memories, and one or more processors, communicatively coupled to the one or more memories, to receive a communication request from a user device. The one or more processors may cause a communication session to be established between the user device and the device based on receiving the communication request, and communicate with the user device via the communication session. The one or more processors may determine, based on communicating with the user device, user information concerning the user device or a user of the user device. The one or more processors may determine, based on the user information, a period of hold time, and cause the user device to be placed on a hold status for the period of hold time. The one or more processors may identify, using a machine learning model, a media item to be presented to the user device during the period of hold time, wherein the machine learning model has been trained to identify the media item based on the user information, wherein the media item is one of a plurality of media items that are associated with a plurality of genres of media items, and wherein the media item is identified to be customized for the user. The one or more processors may present the media item to the user device via the communication session, and may cause, after expiration of the period of hold time, the hold status to be lifted.

According to some implementations, a non-transitory computer-readable medium may store instructions that include one or more instructions that, when executed by one or more processors of a device, cause the one or more processors to receive a machine learning model trained to determine media items to present to user devices while the user devices are on a hold status. The one or more instructions may cause the one or more processors to receive a communication request from a user device, to cause a communication session to be established between the user device and the device based on receiving the communication request, and to communicate with the user device via the communication session. The one or more instructions may cause the one or more processors to determine, based on communicating with the user device, user information relating to the user device or a user of the user device, and determine, after determining the user information, that the user device is placed on the hold status. The one or more instructions may cause the one or more processors to determine, using the machine learning model, a plurality of media items to present to the user device while the user device is placed on the hold status, wherein the plurality of media items are associated with a plurality of genres of media items, and wherein the plurality of media items are customized for the user based on the user information. The one or more instructions may cause the one or more processors to send a message to the user device identifying the plurality of media items, and receive, after sending the message, a response concerning the plurality of media items. The one or more instructions may cause the one or more processors to cause, based on the response, at least one media item of the plurality of media items to be presented to the user device via the communication session, to determine, while the at least one media item is being presented, that the user device is no longer placed on the hold status, and to cause, after determining that the user device is no longer placed on the hold status, the at least one media item to cease being presented.

According to some implementations, a method may include receiving, by a device, a communication request from a user device. The method may include causing, by the device, a communication session to be established between the user device and the device based on receiving the communication request, and communicating, by the device, with the user device via the communication session. The method may include determining, by the device and based on communicating with the user device, user information relating to the user device or a user of the user device, and determining, by the device and after determining the user information, that the user device is placed on a hold status. The method may include determining, by the device and using a machine learning model, a type of media item to be presented to the user device, wherein the machine learning model has been trained to identify types of media items to present to user devices when the user devices are placed in the hold status, and wherein the type of media item is one of a plurality of types of media items. The method may include selecting, by the device, a media item corresponding to the type of media item, and presenting, by the device, the media item to the user device via the communication session. The method may include determining, by the device while the media item is being presented, that the user device is no longer placed on the hold status, and causing, by the device and after determining that the user device is no longer placed on the hold status, the media item to cease being presented.

DETAILED DESCRIPTION

Figure 1A:
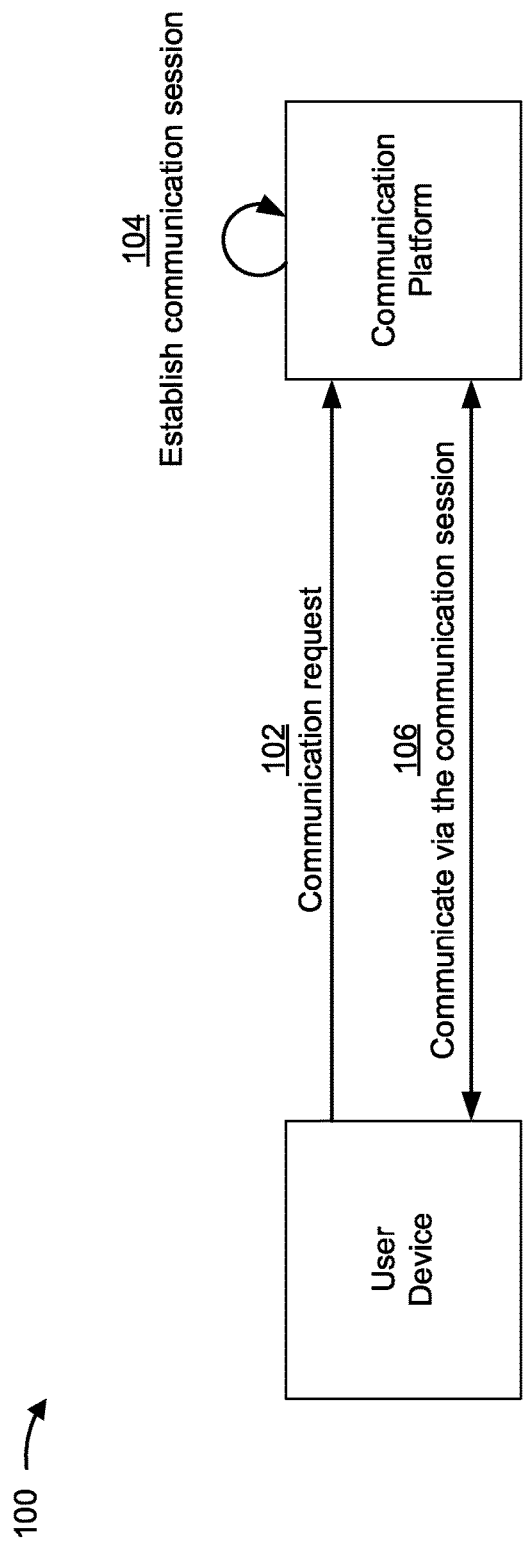
FIGS. 1A-1C are diagrams of example implementations described herein.

The following detailed description of example implementations refers to the accompanying drawings. The same reference numbers in different drawings may identify the same or similar elements.

In some instances, a user calls, via a user device, a telephone number of an organization to interact with an interactive voice response system (IVR) and/or customer service representative (e.g., via a communication platform of the organization). In some cases, the user communicates with the IVR and/or customer service representative, via a communication session, to obtain information (e.g., determine a balance of a financial account) and/or to cause an action to be performed (e.g., transfer money between financial accounts). In some cases, the IVR and/or customer service representative may cause the user device to be placed on a hold status (e.g., the IVR causes the user device to be placed on a hold status to allow a customer service representative to join the communication session, the customer service representative causes the user device to be placed on a hold status while the customer service representative communicates with another customer service representative at the organization, and/or the like). While the user device is placed on the hold status, one or more media items (e.g., "hold music") may be presented to the user device via the communication session. However, the hold music may not be to a user's liking, or worse, may offend the user.

This may increase a likelihood that the user will terminate the communication session (e.g., hang up the call) when the user device is placed on the hold status. This may cause the user to call the organization one or more additional times to try to avoid having to listen to the hold music. This may unnecessarily consume user device resources, network resources, and communication platform resources to support the user placing multiple calls.

Moreover, this may increase a likelihood that the user will mute the call, turn the volume on the call down, walk away from the user device, and/or the like, when the hold music is playing. This may cause the user to not notice when the hold status is removed (e.g., when a customer service representative joins the communication session). Therefore, the user may not interact with the IVR and/or customer service representative after the hold status is removed, which causes the IVR and/or customer service representative to terminate the communication session (e.g., hang up the call) because the user is not available to interact with the IVR and/or customer service representative. This may cause the user to call the organization again, possibly multiple times, which may unnecessarily consume the user device resources, the network resources, and the communication platform resources (e.g., due to multiple calls placed by the user). Moreover, the user device resources, the network resources, and the communication platform resources may be unnecessarily used while the user device is placed on the hold status to maintain a communication session that will terminate before, or soon after, the hold status is lifted.

Some implementations described herein provide a communication platform that receives a communication request from a user device, causes a communication session to be established between the user device and the communication platform, and communicates with the user device via the communication session. In some implementations, the communication platform determines, based on communicating with the user device, user information; determines, based on the user information, a period of hold time (e.g., an estimated amount of time the user device will be placed on a hold status); and causes the user device to be placed on a hold status for the period of hold time. In some implementations, the communication platform identifies, using a machine learning model, a media item to be presented to the user device during the period of hold time, wherein the machine learning model has been trained to identify the media item based on the user information. In some implementations, the communication platform presents the media item to the user device via the communication session, and causes, after expiration of the period of hold time, the hold status to be lifted.

In this way, the communication platform reduces a demand for resources (e.g., memory resources, power resources, communication resources, and/or the like), such as user device resources, network resources, communication platform resources, and/or the like. For example, the communication platform may identify and present a media item that has a high likelihood of conforming to a media preference of the user, which increases a likelihood that the user will stay engaged while the user device is on a hold status and not prematurely terminate the communication session. This decreases a likelihood that the user will subsequently initiate one or more new communication sessions that consume additional user device resources, network resources, communication platform resources, and/or the like. As another example, this may cause the user to notice, because the user is paying attention to the presentation of the media item while the user device is on the hold status, when the hold status is lifted and therefore facilitates the user interacting with the IVR and/or customer service representative after the hold status is lifted. This ensures that the user device resources, network resources, communication platform resources, and/or the like that are used to maintain the communication session while the user device is placed on the hold status are not wasted.

Figure 1B:
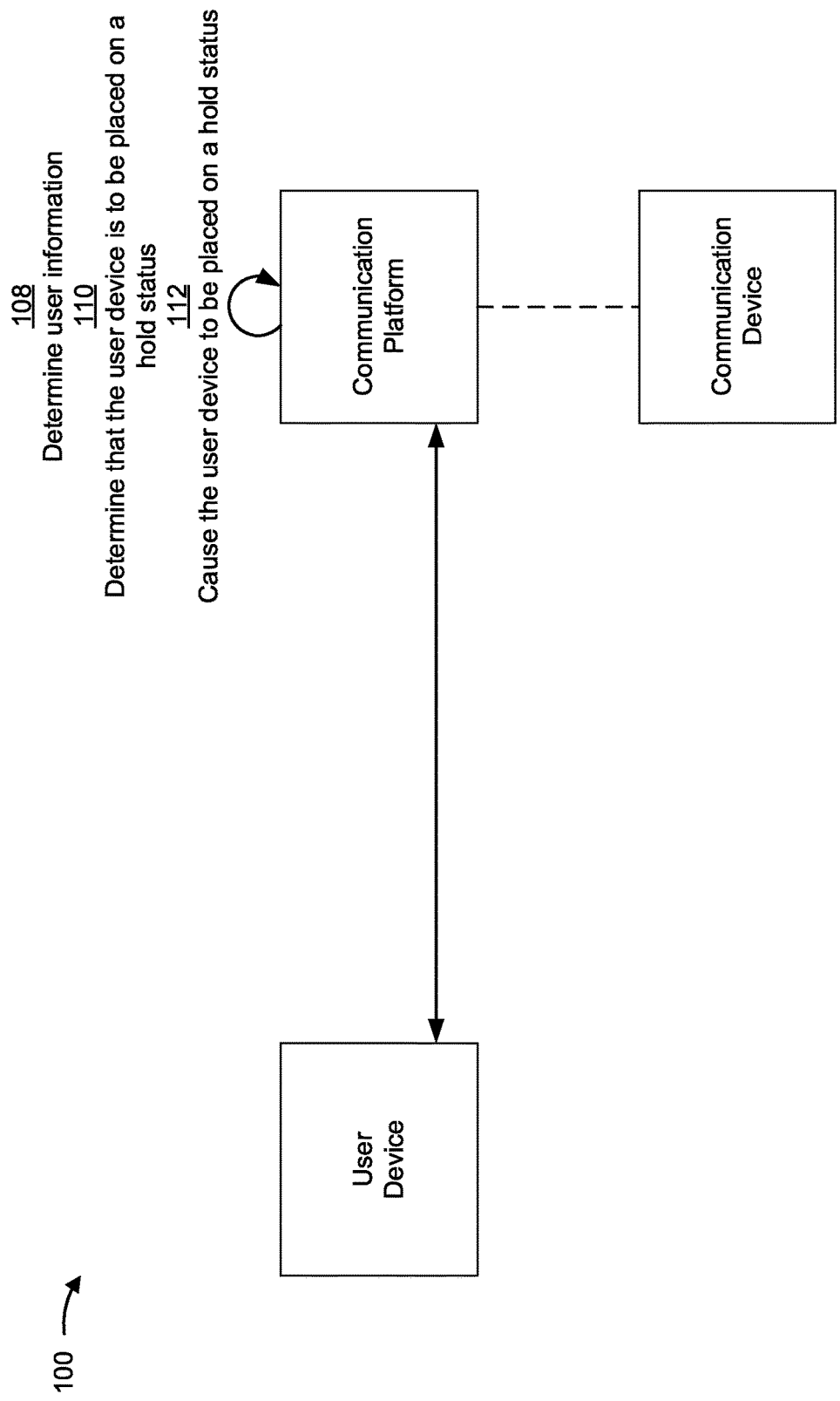
Figure 1C:
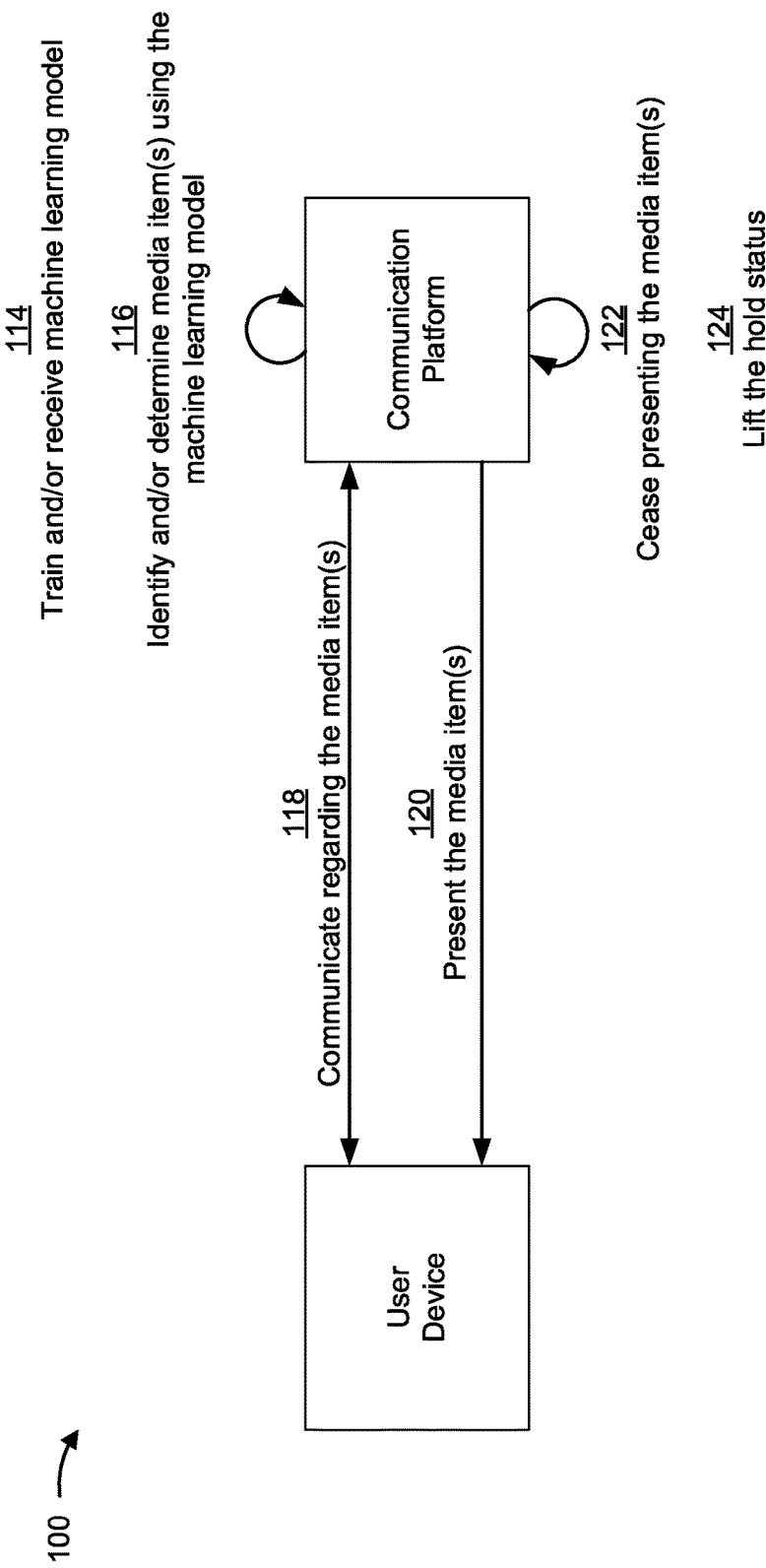

FIGS. 1A-1C are diagrams of an example implementation 100 described herein. As shown in FIG. 1A, example implementation 100 may include a user device and a communication platform. The user device may be a communication and/or computing device, such as a telephone, a mobile phone, a smartphone, a laptop computer, a tablet computer, and/or the like. The communication platform may be a computing device, a server, a cloud computing device, and/or the like. The communication platform may be associated with an organization, such as a company, a financial institution, a school, and/or the like.

In some implementations, the user device and the communication platform may communicate via one or more communication sessions. The communication platform may include one or more interactive voice response systems (IVRs), one or more virtual assistants, and/or the like to interact with a user of the user device via the one or more communication sessions. The communication platform may facilitate the user interacting with a customer service representative of the organization via the one or more communication sessions. For example, the communication platform may enable a communication device (e.g., another user device, and/or the like) associated with the customer service representative to communicate with the user device of the user via the one or more communication sessions.

Some example implementations described herein concern a single user device, and/or communication platform, but implementations may include a plurality of user devices and/or communication platforms. In some implementations, the user device and/or the communication platform may be connected via a network, such as the internet, an intranet, and/or the like.

As shown in FIG. 1A and by reference number 102, the user device may send a communication request to the communication platform. The communication request may be a request for a communication session to be established between the user device and the communication platform. In some implementations, the user may interact, via a user interface of the user device, with an application and/or a program running on the user device to cause the user device to generate and send the communication request. For example, the user may enter a telephone number associated with the organization, via the user interface, into the user device to cause the user device to call the telephone number (e.g., generate and send an audio communication request). As another example, the user may interact, via the user interface, with an application (e.g., select a button in the application) to cause the user device to initiate a video conference call (e.g., generate and send a video communication request). In some implementations, the communication request may include user information, such as information concerning the user (e.g., a name of the user, a username associated with the user, an account associated with the user, an identification string of the user, a media preference of the user, demographic information concerning the user, and/or the like), information concerning the user device (e.g., a username associated with the user device, an account associated with the user device, an identification string associated with the user device, a telephone number associated with the user device, and/or the like), information concerning one or more reasons for the communication request, and/or the like. In some implementations, the user device may send the communication request to the communication platform and/or the communication platform may obtain the communication request from the user device.

As shown by reference number 104, the communication platform may cause a communication session to be established between the user device and the communication platform. For example, the communication platform may establish the communication session with the user device based on receiving the communication request. As another example, the communication platform may send a signal to a different device, such as a server device, to cause the different device to establish the communication session between the user device and the communication platform.

As shown by reference number 106, the communication platform may communicate with the user device via the communication session. For example, the communication platform may receive a first communication, such as first audio data (e.g., one or more dual tone multi-frequency (DTMF) tones entered by the user into the user interface of the user device), first voice data (e.g., one or more words spoken by the user obtained by a microphone of the user device), first video data (e.g., one or more images of the user obtained by a camera of the user device), and/or the like from the user device. The communication platform may process the first communication (e.g., using a natural language processing technique, a facial recognition technique, and/or the like) to determine a content of the first communication. The communication platform may process the content of the first communication to determine a response to the first communication. The communication platform may use an IVR, of the one or more IVRs, a virtual assistant, of the one or more virtual assistants, and/or the like to generate a second communication, such as second audio data, second voice data, second video data, and/or the like based on the response (e.g., using an audio generation technique, a text-to-speech technique, a video generation technique, and/or the like). The communication platform may send the second communication to the user device via the communication session.

Additionally, or alternatively, the communication platform may communicate with the user device using a menu tree of the communication platform. For example, the communication platform (e.g., using the IVR, the virtual assistant, and/or the like) may provide a prompt concerning a menu of the menu tree and the user device may provide a response (e.g., a DTMF tone, a voice selection of a menu, and/or the like) that causes the communication platform to provide a prompt that concerns an additional menu of the menu tree. The communication platform and the user device may communicate in this way until a customer service representative of the organization is to communicate with the user device. In such cases, the communication platform may cause the user device to be placed on a hold status until the customer service representative is available, as described herein.

Additionally, or alternatively, the communication platform may facilitate the customer service representative (e.g., using a communication device) communicating with the user (e.g., using the user device) via the communication session. The customer service representative and the user may communicate using the communication platform and the user device in this way until the customer service representative decides to place the call on hold (e.g., the customer service representative needs to communicate with another customer service representative). In such cases, the customer service representative, via the communication platform, the communication device, and/or the like, may cause the user device to be placed on a hold status as described herein.

As shown in FIG. 1B and by reference number 108, the communication platform may obtain and/or determine the user information. In some implementations, the communication platform may process the communication request to determine the user information. For example, the communication platform may parse the communication request to obtain the user information. In some implementations, the communication platform may obtain and/or determine the user information based on communicating with the user device. For example, the communication platform may communicate (e.g., by using the IVR, the virtual assistant, and/or the like) with the user (e.g., by the user interacting with the user interface of the user device) as described herein to obtain the user information.

In some implementations, the communication platform may converse with the user to obtain initial conversation information and perform a lookup, based on the initial conversation information, in a data structure to obtain the user information. For example, the communication platform may obtain a telephone number of the user device based on communicating with the user device, may perform a lookup in a first data structure based on the telephone number to determine a user account of the user, and may perform a lookup in a second data structure based on the user account to determine the user information. In some implementations, the communication platform may search third-party sources based on the initial conversation information to determine and/or obtain the user information. For example, the communication platform may determine a user profile of the user (e.g., a social media profile of the user) based on communicating with the user device, may search publicly accessible information concerning the user profile of the user to determine at least one media presentation experienced by the user (e.g., a social media post associated with the social media profile of the user that indicates that the user attended a concert), and may determine a media preference of the user based on the at least one media presentation experienced by the user (e.g., a preference for live music, an artist, a music genre, and/or the like).

As shown by reference number 110, the communication platform may determine that the user device is to be placed on a hold status. For example, the communication platform may determine, after obtaining the initial conversation information (e.g., using the IVR, the virtual assistant, and/or the like), that the user is to talk to a customer service representative. A customer service representative may not be available, so the communication platform may determine that the user device is to be placed on a hold status until a customer service representative is available. Additionally, or alternatively, a customer service representative may communicate with the user and determine that the user is to be placed on hold (e.g., so that the customer service representative can perform a task without the user hearing and/or seeing the customer service representative perform the task). The customer service representative may interact with a user interface of the communication device (e.g., press a button on the communication device) to cause the communication device to send a message to the communication platform indicating that the user device is to be placed on a hold status. The communication platform may receive the message and determine that the user device is to be placed on a hold status.

As shown by reference number 112, the communication platform may cause the user device to be placed on a hold status. In some implementations, the communication platform may generate a record associated with the user information, the user device, and/or the like and add the record to a hold queue to cause the user device to be placed on a hold status. The user device may be placed on the hold status as long as the record is in the hold queue. The hold queue may be one of many hold queues and may be associated with one or more elements of the user information, such as the one or more reasons for the communication request. Additionally, or alternatively, a different device, such as the communication device used by the customer service representative, may place the user device on the hold status (e.g., generate the record and add the record to the hold queue). The communication platform may determine that the user device is placed on the hold status by communicating with the different device.

In some implementations, the communication platform may prioritize a position of the record in the hold queue based on the user information. For example, the communication platform may prioritize the position of the record in the hold queue when the user information indicates that the user has previously submitted a communication request for a similar issue a threshold number of times, that the user has an elevated status, that the user has had a relationship with the organization for a threshold amount of time, and/or the like.

In some implementations, the communication platform may determine a period of hold time that the user device will be placed on the hold status. For example, the communication platform may determine the period of hold time based on one or more factors, such as a position of the record in the hold queue, a length of the hold queue, a number of records ahead of the record in the hold queue, a number of customer service representatives handling calls, an average amount of time for a customer service representative to handle a call, and/or the like. The communication platform may cause the user device to be placed on the hold status for the period of hold time.

As shown in FIG. 1C and by reference number 114, the communication platform may train and/or receive a machine learning model. For example, the communication platform may obtain historical user information to generate and/or train the machine learning model. In some implementations, the communication platform may process the historical user information to train the machine learning model to predict one or more media preferences of a user (e.g., a media genre preference, a media type preference, and/or the like). Additionally, or alternatively, the communication platform may process the historical user information to identify one or more media items to present to the user. A media item, of the one or more media items, may be any type of media, such as an image, a video, a song, a podcast, an article, a book, a livestream of an event (e.g., a sporting event, a political speech, a newscast, and/or the like), and/or the like.

In some implementations, the communication platform may perform a set of data manipulation procedures to process the historical user information to generate the machine learning model, such as a data preprocessing procedure, a model training procedure, a model verification procedure, and/or the like. For example, the communication platform may preprocess the historical user information to remove numbers and/or letters, non-ASCII characters, other special characters, white spaces, confidential data, and/or the like. In this way, the communication platform may organize thousands, millions, or billions of data entries for machine learning and model generation.

In some implementations, the communication platform may perform a training operation when generating the machine learning model. For example, the communication platform may portion the historical user information into a training set, a validation set, a test set, and/or the like. In some implementations, a minimum feature set may be created from preprocessing and/or dimensionality reduction of the historical user information. In some implementations, the communication platform may train the machine learning model on this minimum feature set, thereby reducing processing required to train the machine learning model, and may apply a classification technique to the minimum feature set.

In some implementations, the communication platform may use a classification technique, such as a logistic regression classification technique, a random forest classification technique, a gradient boosting machine (GBM) classifier technique, and/or the like to determine a categorical outcome (e.g., that particular user information is associated with a particular media preference, a particular media type preference, a particular media genre preference, a particular media item preference, and/or the like). Additionally, or alternatively, the communication platform may perform a recursive feature elimination procedure to split the data of the minimum feature set into partitions and/or branches, and use the partitions and/or branches to perform predictions (e.g., that particular user information is associated with a particular media preference, a particular media type preference, a particular media genre preference, a particular media item preference, and/or the like). Based on using the recursive feature elimination procedure, the communication platform may reduce utilization of computing resources relative to linear sorting and analysis of data points, thereby enabling use of thousands, millions, or billions of data points to train the machine learning model, which may result in a more accurate machine learning model than using fewer data points.

Additionally, or alternatively, the communication platform may use a support vector machine (SVM) classifier technique to generate a non-linear boundary between data points in the training set. In this case, the non-linear boundary is used to classify test data (e.g., historical user information) into a particular class (e.g., a class indicating that particular user information is associated with a particular media preference, a particular media type preference, a particular media genre preference, a particular media item preference, and/or the like).

Additionally, or alternatively, the communication platform may train the machine learning model using a supervised training procedure that includes receiving input to the model from a subject matter expert, which may reduce an amount of time, an amount of processing resources, and/or the like to train the machine learning model relative to an unsupervised training procedure. In some implementations, the communication platform may use one or more other model training techniques, such as a neural network technique, a latent semantic indexing technique, and/or the like. For example, the communication platform may perform an artificial neural network processing technique (e.g., using a two-layer feedforward neural network architecture, a three-layer feedforward neural network architecture, and/or the like) to perform pattern recognition with regard to patterns of particular user information associated with particular media preferences, particular media type preferences, particular media genre preferences, particular media item preferences, and/or the like. In this case, using the artificial neural network processing technique may improve an accuracy of the machine learning model generated by the communication platform by being more robust to noisy, imprecise, or incomplete data, and by enabling the communication platform to detect patterns and/or trends undetectable to systems using less complex techniques.

In some implementations, a different device, such as a server device, may generate and train the machine learning model. The different device may send the machine learning model to the communication platform. The different device may update and send (e.g., on a scheduled basis, on an on-demand basis, on a triggered basis, and/or the like) the machine learning model to the communication platform.

Accordingly, the communication platform may use any number of artificial intelligence techniques, machine learning techniques, deep learning techniques, and/or the like to determine an association between user information and a media preference, a media type preference, a media genre preference, a media item preference, and/or the like.

As shown by reference number 116, the communication platform may identify and/or determine one or more media items to present to the user device using the machine learning model. The one or more media items may be customized for the user (e.g., based on the user information) to, for example, increase a likelihood that the user does not end the communication session prior to an expiration of the period of hold time and/or that the user stays engaged during the period of hold time. The one or more media items may be associated with a plurality of genres of media items, a plurality of types of media items, and/or the like.

In some implementations, the communication platform may process the user information to determine particular user information (e.g., determine one or more elements of the user information, such as one or more elements of the information concerning the user, the information concerning the user device, the information concerning the one or more reasons for communication request, and/or the like) and may determine the one or more media items using the machine learning model based on the particular user information. For example, the communication platform may process the user information to determine one or more media-related transactions of a financial account of the user (e.g., one or more financial transactions related to media, such as purchasing tickets to a concert, a movie, a book reading, a lecture, and/or the like; purchasing a song, a book, a magazine, a movie, a documentary, and/or the like; purchasing a subscription to a media streaming service (e.g., Netflix, Hulu, Spotify, Pandora, Apple Music, Audible, and/or the like)). The communication platform may use the machine learning model to determine the one or more media items based on the one or more media-related transactions.

In some implementations, the communication platform may process the user information to determine particular user information and may identify and/or determine a media preference, a media type preference, a media genre preference, a media item preference, and/or the like of the user using the machine learning model based on the particular user information. Further, the communication platform may determine the one or more media items based on the media preference, the media type preference, the media genre preference, the media item preference, and/or the like of the user. For example, the communication platform may process the user information to determine a demographic of the user and use the machine learning model to determine a media genre preference of the user. The communication platform may then determine the one or more media items based on the media genre preference of the user. As another example, the communication platform may process the user information to determine a user account of the user (e.g., a streaming media account of the user, a social media account of the user, a blog account of the user, and/or the like). The communication platform may use the machine learning model to determine a media type preference and/or media genre preference of the user based on the user account of the user (e.g., based on publicly-accessible information associated with the user account, such as a media playlist, a post about media, a comment about media, and/or the like). The communication platform may then determine the one or more media items based on the media type preference and/or the media genre preference of the user.

In some implementations, the communication platform may determine a set of media items of the one or more media items to present to the user device via the communication session. For example, the communication platform may determine a respective run-time associated with the one or more media items and determine the set of media items that have a respective run-time that correlates with the period of hold time (e.g., a respective run-time that matches the period of hold time within a threshold amount of time). As another example, the communication platform may determine the set of media items that, added together, have a total run-time that correlates with the period of hold time. In this way, the communication platform can determine the set of media items that have a high likelihood of being fully presented during the period of hold time.

As shown by reference number 118, the communication platform may communicate with the user device regarding the one or more media items, the set of media items, and/or the like. For example, the communication platform may send a message to the user device (e.g. via the communication session) identifying the one or more media items, the set of media items, and/or the like. The message may indicate that the user is to indicate at least one preference concerning the one or more media items, the set of media items, and/or the like. The user device may present the message (e.g. display the message on a display of the user device, emit the message on a speaker of the user device, and/or the like) and the user may interact with the user interface of the user device to input a response into the user device. The response may concern the one or more media items, the set of media items, and/or the like. For example, the response may indicate a selection of one or more preferred media items of the one or more media items, the set of media items, and/or the like; may indicate at least one preference concerning the one or more media items, the set of media items, and/or the like; and/or the like. The user device may send the response to the communication platform (e.g., via the communication session) and/or the communication platform may obtain the response from the user device.

As shown by reference number 120, the communication platform may cause the one or more media items, the set of media items, the one or more preferred media items, and/or the like to be presented to the user device via the communication session. For example, the communication platform may present the one or more media items, the set of media items, the one or more preferred media items, and/or the like to the user device via the communication session (e.g., cause a display of the user device to display the one or more media items; cause a speaker of the user device to emit the one or more media items; and/or the like). Additionally, or alternatively, the communication platform may cause a different device, such as the communication device used by the customer service representative, to present the one or more media items, the set of media items, the one or more preferred media items, and/or the like to the user device via the communication session. Presenting the one or more media items, the set of media items, the one or more preferred media items, and/or the like may cause a display of the user device to display video associated with the one or more media items, the set of media items, the one or more preferred media items, and/or the like, a speaker of the user device to emit audio associated with the one or more media items, the set of media items, the one or more preferred media items, and/or the like.

As shown by reference number 122, the communication platform may cause the one or more media items, the set of media items, the one or more preferred media items, and/or the like to cease being presented to the user device via the communication session. For example, the communication platform may cause a media item to cease being presented to the user device via the communication session after a run-time of the media item expires. In another example, the communication platform may send a message to the user device (e.g., via the communication session) indicating that the user can select a stop time to cease presentation of the one or more media items, the set of media items, the one or more preferred media items, and/or the like. The user device may display and/or present the message to the user and the user may interact with the user interface of the user device to input a response into the user device. The response may indicate the stop time to cease presentation of the one or more media items, the set of media items, the one or more preferred media items, and/or the like. The communication platform, based on the response, may cause the one or more media items, the set of media items, the one or more preferred media items, and/or the like to cease being presented at the stop time.

As another example, the communication platform may send a query to the user device (e.g., via the communication session) concerning whether the user wants the one or more media items, the set of media items, the one or more preferred media items, and/or the like to finish being presented. The user device may display and/or present the query to the user and the user may interact with the user interface of the user device to input a reply into the user device. The reply may indicate that the user wants the one or more media items, the set of media items, the one or more preferred media items, and/or the like to finish being presented. The communication platform, based on the reply, may determine an end time of the one or more media items, the set of media items, the one or more preferred media items, and/or the like and cause the one or more media items, the set of media items, the one or more preferred media items, and/or the like to cease being presented at the end time. Additionally, or alternatively, the response may indicate that the user wants the one or more media items, the set of media items, the one or more preferred media items, and/or the like to cease being presented. The communication platform, based on the response, may cause the one or more media items, the set of media items, the one or more preferred media items, and/or the like to immediately cease being presented.

As shown by reference number 124, the communication platform may cause the hold status to be lifted. In some implementations, the communication platform may cause the hold status to be lifted after expiration of the period of hold time. For example, the communication platform may remove the record associated with the user device from the hold queue. This may enable the user device and the communication platform to communicate via the communication session again. Additionally, or alternatively, the communication platform may determine that the user device is no longer placed on the hold status. For example, a different device, such as the communication device used by the customer service representative, may lift the hold status.

In some implementations, the communication platform may monitor the communication session and determine that the user device is no longer placed on the hold status. The communication platform, after determining that the user device is no longer placed on the hold status, may cause the one or more media items, the set of media items, the one or more preferred media items, and/or the like, to cease being presented to the user device via the communication session as described herein.

As indicated above, FIGS. 1A-1C are provided merely as an example. Other examples may differ from what is described with regard to FIGS. 1A-1C.

Figure 2:
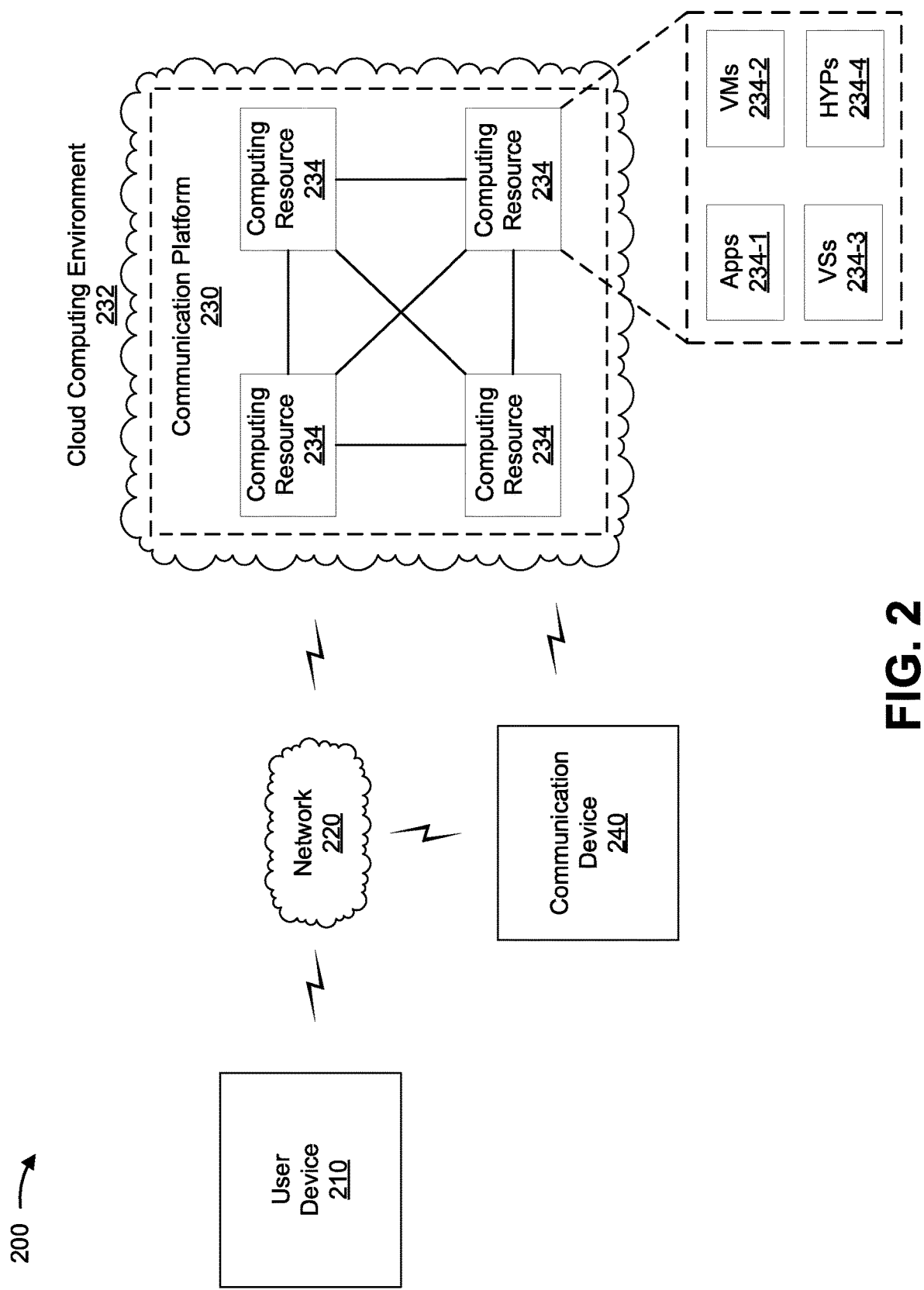
FIG. 2 is a diagram of an example environment in which systems and/or methods, described herein, may be implemented.

FIG. 2 is a diagram of an example environment 200 in which systems and/or methods described herein may be implemented. As shown in FIG. 2, environment 200 may include a user device 210, a network 220, a communication platform 230 in a cloud computing environment 232 that includes computing resources 234, and/or the like. Devices of environment 200 may interconnect via wired connections, wireless connections, or a combination of wired and wireless connections.

User device 210 includes one or more devices capable of receiving, generating, storing, processing, and/or providing information, such as information described herein. For example, user device 210 may include a computer (e.g., a desktop computer, a laptop computer, a tablet computer, a handheld computer, a server device, etc.), a mobile phone (e.g., a smart phone, a radiotelephone, etc.), an internet of things (IoT) device or smart appliance, or a similar device. In some implementations, user device 210 may receive information from and/or transmit information to communication platform 230, communication device 240, and/or the like.

Network 220 includes one or more wired and/or wireless networks. For example, network 220 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the internet, a fiber optic-based network, a cloud computing network, a mesh network and/or the like, and/or a combination of these or other types of networks.

Communication platform 230 includes one or more devices that receive a communication request from user device 210, establish a communication session and communicate with user device 210 via the communication session, determine user information and cause user device 210 to be placed on a hold status, identify media items and communicate with user device 210 regarding the media items, present the media items to user device 210, cease presenting the media items and lift the hold status, and/or the like.

In some implementations, communication platform 230 may be designed to be modular such that certain software components may be swapped in or out depending on a particular need. As such, communication platform 230 may be easily and/or quickly reconfigured for different uses. In some implementations, communication platform 230 may receive information from and/or transmit information to user device 210, such as via network 220.

In some implementations, as shown, communication platform 230 may be hosted in a cloud computing environment 232. Notably, while implementations described herein describe communication platform 230 as being hosted in cloud computing environment 232, in some implementations, communication platform 230 may be non-cloud-based (i.e., may be implemented outside of a cloud computing environment) or may be partially cloud-based.

Cloud computing environment 232 includes an environment that hosts communication platform 230. Cloud computing environment 232 may provide computation, software, data access, storage, etc. services that do not require end-user knowledge of a physical location and configuration of system(s) and/or device(s) that hosts communication platform 230. As shown, cloud computing environment 232 may include a group of computing resources 234 (referred to collectively as "computing resources 234" and individually as "computing resource 234").

Computing resource 234 includes one or more personal computers, workstation computers, server devices, or other types of computation and/or communication devices. In some implementations, computing resource 234 may host communication platform 230. The cloud resources may include compute instances executing in computing resource 234, storage devices provided in computing resource 234, data transfer devices provided by computing resource 234, etc. In some implementations, computing resource 234 may communicate with other computing resources 234 via wired connections, wireless connections, or a combination of wired and wireless connections.

As further shown in FIG. 2, computing resource 234 includes a group of cloud resources, such as one or more applications ("APPs") 234-1, one or more virtual machines ("VMs") 234-2, virtualized storage ("VSs") 234-3, one or more hypervisors ("HYPs") 234-4, and/or the like.

Application 234-1 includes one or more software applications that may be provided to or accessed by user device 210. Application 234-1 may eliminate a need to install and execute the software applications on user device 210. For example, application 234-1 may include software associated with communication platform 230 and/or any other software capable of being provided via cloud computing environment 232. In some implementations, one application 234-1 may send/receive information to/from one or more other applications 234-1, via virtual machine 234-2.

Virtual machine 234-2 includes a software implementation of a machine (e.g., a computer) that executes programs like a physical machine. Virtual machine 234-2 may be either a system virtual machine or a process virtual machine, depending upon use and degree of correspondence to any real machine by virtual machine 234-2. A system virtual machine may provide a complete system platform that supports execution of a complete operating system ("OS"). A process virtual machine may execute a single program, and may support a single process. In some implementations, virtual machine 234-2 may execute on behalf of a user (e.g., a user of user device 210), and may manage infrastructure of cloud computing environment 232, such as data management, synchronization, or long-duration data transfers.

Virtualized storage 234-3 includes one or more storage systems and/or one or more devices that use virtualization techniques within the storage systems or devices of computing resource 234. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 234-4 may provide hardware virtualization techniques that allow multiple operating systems (e.g., "guest operating systems") to execute concurrently on a host computer, such as computing resource 234. Hypervisor 234-4 may present a virtual operating platform to the guest operating systems, and may manage the execution of the guest operating systems. Multiple instances of a variety of operating systems may share virtualized hardware resources.

Communication device 240 includes one or more devices capable of receiving, generating, storing, processing, and/or providing information, such as information described herein. For example, communication device 240 may include a computer (e.g., a desktop computer, a laptop computer, a tablet computer, a handheld computer, a server device, etc.), a mobile phone (e.g., a smart phone, a radiotelephone, etc.), an internet of things (IoT) device or smart appliance, or a similar device. In some implementations, communication device 240 may receive information from and/or transmit information to communication platform 230, user device 210, and/or the like.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
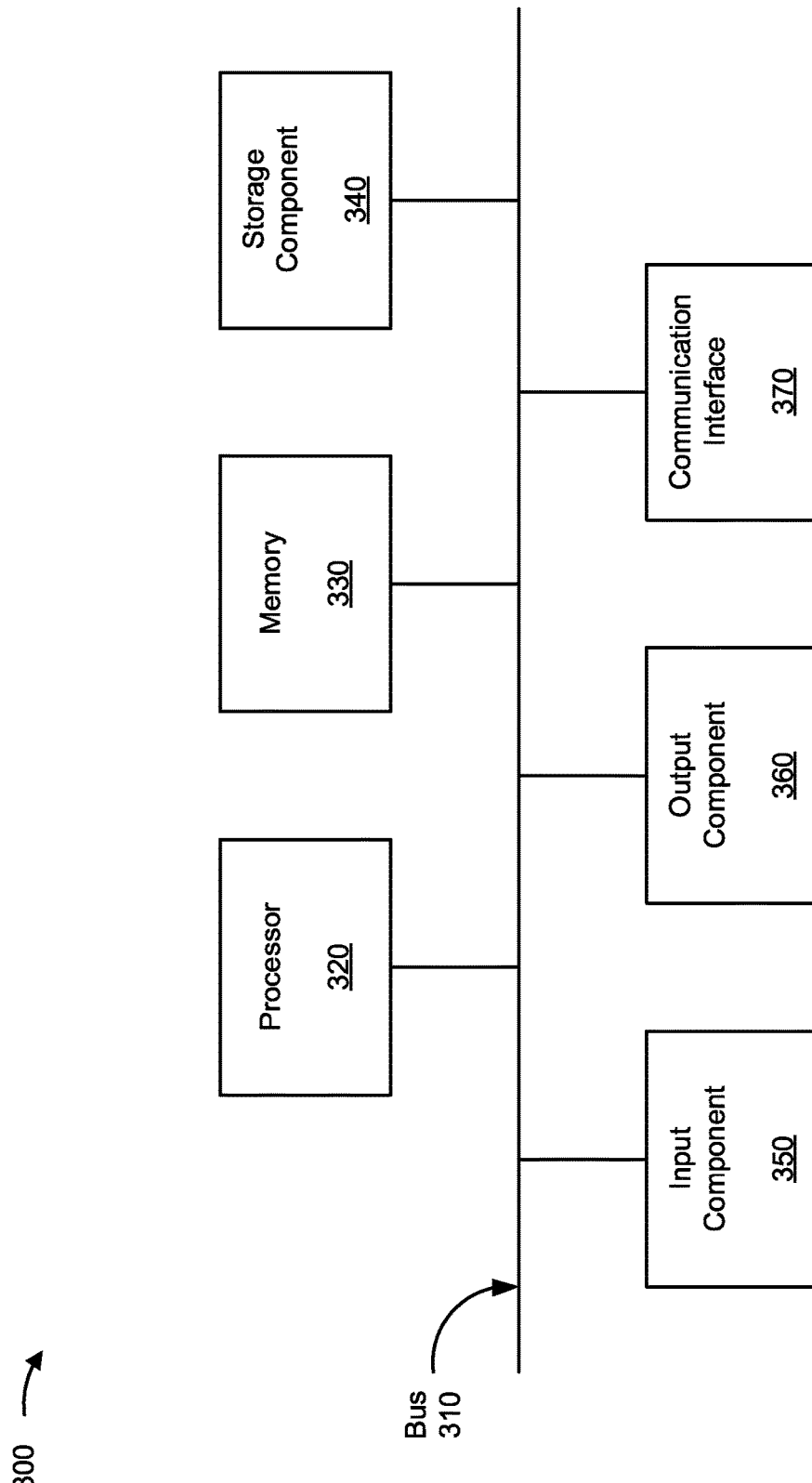
FIG. 3 is a diagram of example components of one or more devices of FIG. 2.

FIG. 3 is a diagram of example components of a device 300. Device 300 may correspond to user device 210, communication platform 230, computing resource 234, and/or the like. In some implementations, user device 210, communication platform 230, computing resource 234, and/or the like may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
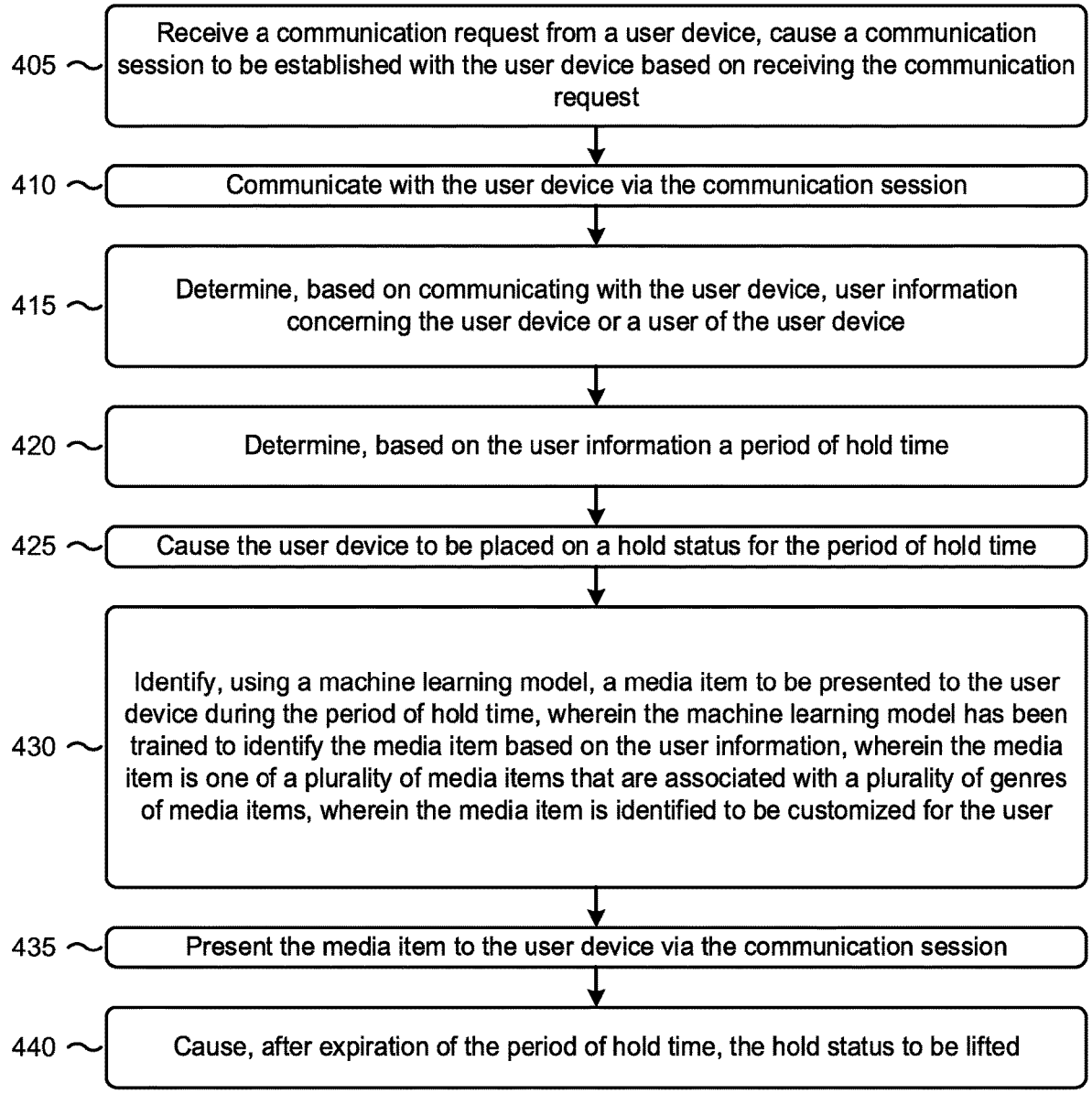
FIGS. 4-6 are flow charts of example processes for identifying a media item to present to a user device via a communication session.

FIG. 4 is a flow chart of an example process 400 for identifying a media item to present to a user device via a communication session. In some implementations, one or more process blocks of FIG. 4 may be performed by a communication platform (e.g., communication platform 230). In some implementations, one or more process blocks of FIG. 4 may be performed by another device or a group of devices separate from or including the communication platform, such as a user device (e.g., user device 210).

As shown in FIG. 4, process 400 may include receiving a communication request from a user device and causing a communication session to be established with the user device based on receiving the communication request (block 405). For example, the communication platform (e.g., using computing resource 234, processor 320, memory 330, storage component 340, input component 350, communication interface 370, and/or the like) may receive a communication request from a user device and cause a communication session to be established with the user device based on receiving the communication request, as described above.

As further shown in FIG. 4, process 400 may include communicating with the user device via the communication session (block 410). For example, the communication platform (e.g., using computing resource 234, processor 320, memory 330, storage component 340, communication interface 370, and/or the like) may communicate with the user device via the communication session, as described above.

As further shown in FIG. 4, process 400 may include determining, based on communicating with the user device, user information concerning the user device or a user of the user device (block 415). For example, the communication platform (e.g., using computing resource 234, processor 320, memory 330, storage component 340, and/or the like) may determine, based on communicating with the user device, user information concerning the user device or a user of the user device, as described above.

As further shown in FIG. 4, process 400 may include determining, based on the user information, a period of hold time (block 420). For example, the communication platform (e.g., using computing resource 234, processor 320, memory 330, storage component 340, and/or the like) may determine, based on the user information, a period of hold time, as described above.

As further shown in FIG. 4, process 400 may include causing the user device to be placed on a hold status for the period of hold time (block 425). For example, the communication platform (e.g., using computing resource 234, processor 320, memory 330, storage component 340, communication interface 370, and/or the like) may cause the user device to be placed on a hold status for the period of hold time, as described above.

As further shown in FIG. 4, process 400 may include identifying, using a machine learning model, a media item to be presented to the user device during the period of hold time, wherein the machine learning model has been trained to identify the media item based on a length of the period of hold time and the user information, wherein the media item is one of a plurality of media items that are associated with a plurality of genres of media items, and wherein the media item is identified to be customized for the user (block 430). For example, the communication platform (e.g., using computing resource 234, processor 320, memory 330, storage component 340, and/or the like) may identify, using a machine learning model, a media item to be presented to the user device during the period of hold time, as described above. In some implementations, the machine learning model has been trained to identify the media item based on a length of the period of hold time and the user information, the media item is one of a plurality of media items that are associated with a plurality of genres of media items, and the media item is identified to be customized for the user (for example, to increase a likelihood that the user does not end the communication session prior to an expiration of the period of hold time and/or that the user stays engaged during the period of hold time).

As further shown in FIG. 4, process 400 may include presenting the media item to the user device via the communication session (block 435). For example, the communication platform (e.g., using computing resource 234, processor 320, memory 330, storage component 340, output component 360, communication interface 370, and/or the like) may present the media item to the user device via the communication session, as described above.

As further shown in FIG. 4, process 400 may include causing, after expiration of the period of hold time, the hold status to be lifted (block 440). For example, the communication platform (e.g., using computing resource 234, processor 320, memory 330, storage component 340, communication interface 370, and/or the like) may cause, after expiration of the period of hold time, the hold status to be lifted, as described above.

Process 400 may include additional implementations, such as any single implementation or any combination of implementations described below and/or in connection with one or more other processes described elsewhere herein.

In some implementations, when determining the period of hold time, the communication platform may generate a record associated with the user information, may add the record to a hold queue associated with at least one reason for the communication request, may determine a length of the hold queue, and may determine the period of hold time based on the length of the hold queue.

In some implementations, when identifying the media item to be presented to the user device, the communication platform may determine, based on the user information, a user account of the user, may determine, based on the user account, a media preference of the user using the machine learning model, and may identify the media item to be presented based on the media preference. In some implementations, when identifying the media item to be presented to the user device, the communication platform may determine, based on the user information, a demographic of the user, may determine, based on the demographic of the user, a media genre using the machine learning model, and may identify the media item to be presented based on the media genre.

In some implementations, when identifying the media item to be presented to the user device, the communication platform may determine, based on the information concerning the user, at least one media-related transaction, and may identify the media item to be presented based on the at least one media-related transaction and using the machine learning model. In some implementations, when identifying the media item to be presented to the user device, the communication platform may determine a respective run-time associated with the plurality of media items, and may determine a particular media item, of the plurality of media items, that has a run-time that correlates with the period of hold time.

In some implementations, when causing the hold status to be lifted, the communication platform may cause the media item to cease being presented to the user device via the communication session after a run-time of the media item expires. In some implementations, when causing the hold status to be lifted, the communication platform may send a query to the user device asking the user of the user device if the user wants the media item to cease being presented, may receive a response from the user device indicating that the user wants the media item to cease being presented, and may cause the media item to cease being presented to the user device based on the response from the user device.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
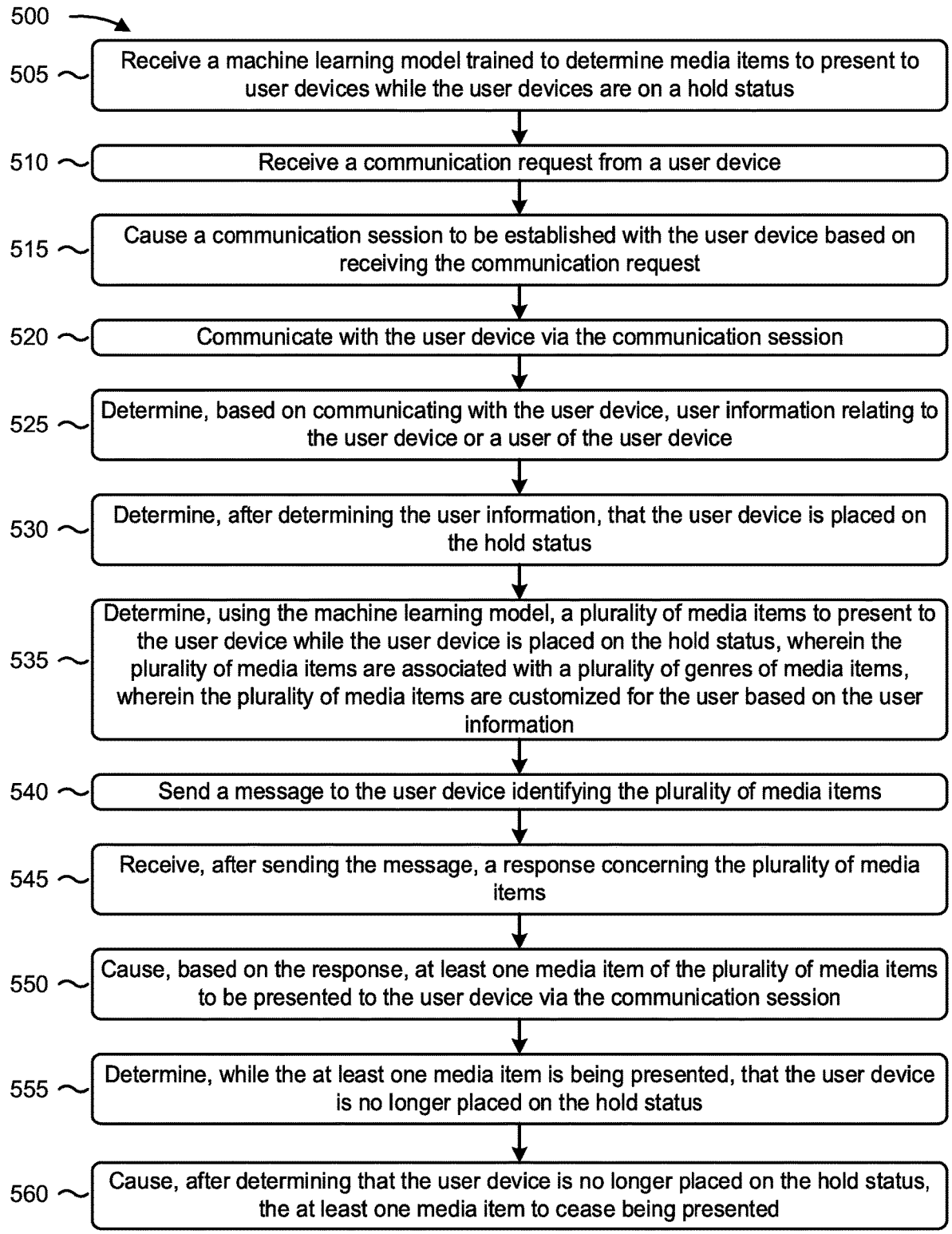

FIG. 5 is a flow chart of an example process 500 for identifying a plurality of media items to present to a user device via a communication session. In some implementations, one or more process blocks of FIG. 5 may be performed by a communication platform (e.g., communication platform 230). In some implementations, one or more process blocks of FIG. 5 may be performed by another device or a group of devices separate from or including the communication platform, such as a user device (e.g., user device 210).

As shown in FIG. 5, process 500 may include receiving a machine learning model trained to determine media items to present to user devices while the user devices are on a hold status (block 505). For example, the communication platform (e.g., using computing resource 234, processor 320, memory 330, storage component 340, input component 350, communication interface 370, and/or the like) may receive a machine learning model trained to determine media items to present to user devices while the user devices are on a hold status, as described above.

As further shown in FIG. 5, process 500 may include receiving a communication request from a user device (block 510). For example, the communication platform (e.g., using computing resource 234, processor 320, memory 330, storage component 340, input component 350, communication interface 370, and/or the like) may receive a communication request from a user device, as described above.

As further shown in FIG. 5, process 500 may include causing a communication session to be established with the user device based on receiving the communication request (block 515). For example, the communication platform (e.g., using computing resource 234, processor 320, memory 330, storage component 340, communication interface 370, and/or the like) may cause a communication session to be established with the user device based on receiving the communication request, as described above.

As further shown in FIG. 5, process 500 may include communicating with the user device via the communication session (block 520). For example, the communication platform (e.g., using computing resource 234, processor 320, memory 330, storage component 340, communication interface 370, and/or the like) may communicate with the user device via the communication session, as described above.

As further shown in FIG. 5, process 500 may include determining, based on communicating with the user device, user information relating to the user device or a user of the user device (block 525). For example, the communication platform (e.g., using computing resource 234, processor 320, memory 330, storage component 340, and/or the like) may determine, based on communicating with the user device, user information relating to the user device or a user of the user device, as described above.

As further shown in FIG. 5, process 500 may include determining, after determining the user information, that the user device is placed on the hold status (block 530). For example, the communication platform (e.g., using computing resource 234, processor 320, memory 330, storage component 340, and/or the like) may determine, after determining the user information, that the user device is placed on the hold status, as described above.

As further shown in FIG. 5, process 500 may include determining, using the machine learning model, a plurality of media items to present to the user device while the user device is placed on the hold status, wherein the plurality of media items are associated with a plurality of genres of media items, and wherein the plurality of media items are customized for the user based on the user information (block 535). For example, the communication platform (e.g., using computing resource 234, processor 320, memory 330, storage component 340, and/or the like) may determine, using the machine learning model, a plurality of media items to present to the user device while the user device is placed on the hold status, as described above. In some implementations, the plurality of media items are associated with a plurality of genres of media items, and the plurality of media items are customized for the user based on the user information.

As further shown in FIG. 5, process 500 may include sending a message to the user device identifying the plurality of media items (block 540). For example, the communication platform (e.g., using computing resource 234, processor 320, memory 330, storage component 340, output component 360, communication interface 370, and/or the like) may send a message to the user device identifying the plurality of media items, as described above.

As further shown in FIG. 5, process 500 may include receiving, after sending the message, a response concerning the plurality of media items (block 545). For example, the communication platform (e.g., using computing resource 234, processor 320, memory 330, storage component 340, input component 350, communication interface 370, and/or the like) may receive, after sending the message, a response concerning the plurality of media items, as described above.

As further shown in FIG. 5, process 500 may include causing, based on the response, at least one media item of the plurality of media items to be presented to the user device via the communication session (block 550). For example, the communication platform (e.g., using computing resource 234, processor 320, memory 330, storage component 340, output component 360, communication interface 370, and/or the like) may cause, based on the response, at least one media item of the plurality of media items to be presented to the user device via the communication session, as described above.

As further shown in FIG. 5, process 500 may include determining, while the at least one media item is being presented, that the user device is no longer placed on the hold status (block 555). For example, the communication platform (e.g., using computing resource 234, processor 320, memory 330, storage component 340, and/or the like) may determine, while the at least one media item is being presented, that the user device is no longer placed on the hold status, as described above.

As further shown in FIG. 5, process 500 may include causing, after determining that the user device is no longer placed on the hold status, the at least one media item to cease being presented (block 560). For example, the communication platform (e.g., using computing resource 234, processor 320, memory 330, storage component 340, output component 360, communication interface 370, and/or the like) may cause, after determining that the user device is no longer placed on the hold status, the at least one media item to cease being presented, as described above.

Process 500 may include additional implementations, such as any single implementation or any combination of implementations described below and/or in connection with one or more other processes described elsewhere herein.

In some implementations, when determining the plurality of media items to present to the user device while the user device is placed on the hold status, the communication platform may determine, based on the user information, a user account of the user, may determine, based on the user account, a media playlist, and may determine the plurality of media items to present to the user device using the machine learning model and based on the media playlist. In some implementations, when determining the plurality of media items to present to the user device while the user device is placed on the hold status, the communication platform may determine, based on the user information, information concerning at least one financial transaction of the user, may determine, based on the at least one financial transaction of the user, a media preference, and may determine the plurality of media items using the machine learning model and based on the media preference.

In some implementations, the message may indicate that the user of the user device is to indicate at least one preference concerning the plurality of media items, and the response may indicate the at least one preference concerning the plurality of media items. In some implementations, when causing the at least one media item to cease being presented, the communication platform may send a query to the user device concerning whether the user wants the at least one media item to finish being presented, may receive a reply to the query indicating that the user wants the at least one media item to finish being presented, may determine an end time of the at least one media item, and may cause the at least one media item to cease being presented at the end time of the at least one media item.

In some implementations, when causing the at least one media item to cease being presented, the communication platform may send a query to the user device concerning when the user wants the at least one media item to cease being presented, may receive a reply to the query indicating that the user wants the at least one media item to cease being presented, and may cause, based on the reply, the at least one media item to immediately cease being presented.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
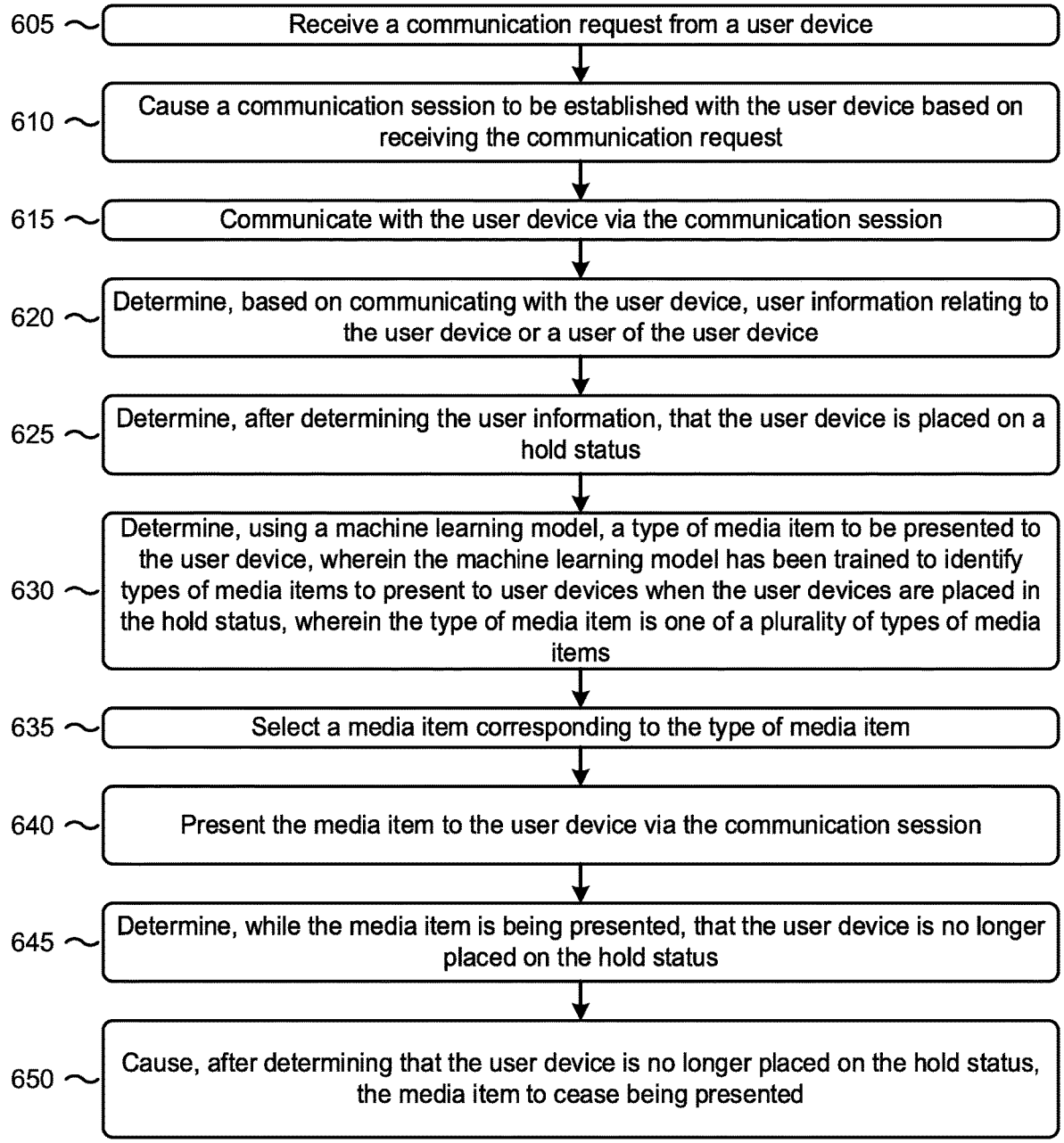

FIG. 6 is a flow chart of an example process 600 for selecting a media item to present to a user device via a communication session. In some implementations, one or more process blocks of FIG. 6 may be performed by a communication platform (e.g., communication platform 230). In some implementations, one or more process blocks of FIG. 6 may be performed by another device or a group of devices separate from or including the communication platform, such as a user device (e.g., user device 210).

As shown in FIG. 6, process 600 may include receiving a communication request from a user device (block 605). For example, the communication platform (e.g., using computing resource 234, processor 320, memory 330, storage component 340, input component 350, communication interface 370, and/or the like) may receive a communication request from a user device, as described above.

As further shown in FIG. 6, process 600 may include causing a communication session to be established with the user device based on receiving the communication request (block 610). For example, the communication platform (e.g., using computing resource 234, processor 320, memory 330, storage component 340, communication interface 370, and/or the like) may cause a communication session to be established with the user device based on receiving the communication request, as described above.

As further shown in FIG. 6, process 600 may include communicating with the user device via the communication session (block 615). For example, the communication platform (e.g., using computing resource 234, processor 320, memory 330, storage component 340, communication interface 370, and/or the like) may communicate with the user device via the communication session, as described above.

As further shown in FIG. 6, process 600 may include determining, based on communicating with the user device, user information relating to the user device or a user of the user device (block 620). For example, the communication platform (e.g., using computing resource 234, processor 320, memory 330, storage component 340, and/or the like) may determine, based on communicating with the user device, user information relating to the user device or a user of the user device, as described above.

As further shown in FIG. 6, process 600 may include determining, after determining the user information, that the user device is placed on a hold status (block 625). For example, the communication platform (e.g., using computing resource 234, processor 320, memory 330, storage component 340, and/or the like) may determine, after determining the user information, that the user device is placed on a hold status, as described above.

As further shown in FIG. 6, process 600 may include determining, using a machine learning model, a type of media item to be presented to the user device, wherein the machine learning model has been trained to identify types of media items to present to user devices when the user devices are placed in the hold status, and wherein the type of media item is one of a plurality of types of media items (block 630). For example, the communication platform (e.g., using computing resource 234, processor 320, memory 330, storage component 340, and/or the like) may determine, using a machine learning model, a type of media item to be presented to the user device, as described above. In some implementations, the machine learning model has been trained to identify types of media items to present to user devices when the user devices are placed in the hold status, and the type of media item is one of a plurality of types of media items.

As further shown in FIG. 6, process 600 may include selecting a media item corresponding to the type of media item (block 635). For example, the communication platform (e.g., using computing resource 234, processor 320, memory 330, storage component 340, and/or the like) may select a media item corresponding to the type of media item, as described above.

As further shown in FIG. 6, process 600 may include presenting the media item to the user device via the communication session (block 640). For example, the communication platform (e.g., using computing resource 234, processor 320, memory 330, storage component 340, output component 360, communication interface 370, and/or the like) may present the media item to the user device via the communication session, as described above.

As further shown in FIG. 6, process 600 may include determining, while the media item is being presented, that the user device is no longer placed on the hold status (block 645). For example, the communication platform (e.g., using computing resource 234, processor 320, memory 330, storage component 340, communication interface 370, and/or the like) may determine, while the media item is being presented, that the user device is no longer placed on the hold status, as described above.

As further shown in FIG. 6, process 600 may include causing, after determining that the user device is no longer placed on the hold status, the media item to cease being presented (block 650). For example, the communication platform (e.g., using computing resource 234, processor 320, memory 330, storage component 340, output component 360, communication interface 370, and/or the like) may cause, after determining that the user device is no longer placed on the hold status, the media item to cease being presented, as described above.

Process 600 may include additional implementations, such as any single implementation or any combination of implementations described below and/or in connection with one or more other processes described elsewhere herein.

In some implementations, when communicating with the user device via the communication session, the communication platform may receive a communication that includes at least one spoken word or at least one dual tone multi-frequency (DTMF) tone, where determining the user information comprises processing the communication to determine the user information.

In some implementations, when determining the user information, the communication platform may obtain a telephone number of the user device based on communicating with the user device, may determine a user account associated with the telephone number, and may determine the user information based on the user account. In some implementations, when determining the user information, the communication platform may determine, based on communicating with the user device, a user profile of the user, may determine, based on the user profile, at least one media presentation experienced by the user, and may determine, based on the at least one media presentation experienced by the user, a media preference of the user.

In some implementations, when determining the type of media item to be presented to the user device, the communication platform may determine a media genre preference based on the user information, and may determine the type of media item using the machine learning model and based on the media genre preference. In some implementations, when causing the media item to cease being presented, the communication platform may send a message to the user device indicating that the user can select a stop time to cease presentation of the media item, may receive a response from the user device indicating the stop time to cease presentation of the media item, and may cause the media item to cease being presented at the stop time.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    obtaining, by a device, user information relating to a user device or a user of the user device,
        the user device being in a communication session with another device;
    determining, by the device and after determining the user information, that the user device is placed on a hold status;
    determining, by the device and based on the user information, a set of media items to be presented to the user device; and
    providing, by the device, information related to the set of media items to the user device via the communication session.

2. The method of claim 1, wherein the user information comprises one or more of:
    a name of the user,
    a username associated with the user,
    an account associate with the user,
    an identification string of the user,
    a media preference of the user,
    demographic information concerning the user, or
    information concerning one or more reasons for a communication request.

3. The method of claim 1, wherein obtaining the user information comprises:
    obtaining the user information based on establishing the communication session with the user device.

4. The method of claim 1, wherein the information related to the set of media items comprises:
    a message identifying one or more media items of the set of media items for the user to select.

5. The method of claim 1, further comprising:
    obtaining a response regarding the information related to the set of media items; and
    performing an action regarding the set of media items based on the response regarding the information related to the set of media items.

6. The method of claim 1, further comprising:
    determining a period of hold time associated with the hold status; and
    determining the set of media items based on a respective run-time of one or more items of the set of media items that have a run-time that correlates with the hold time.

7. The method of claim 1, further comprising:
    determining, based on the user information, one or more of:
        a media preference,
        a media type preference,
        a media genre preference, or
        a media item preference; and
    wherein determining the set of media items comprises:
        determining the set of media items based on the one or more of the media preference, the media type preference, the media genre preference, or the media item preference.

8. A device, comprising:
    one or more memories; and one or more processors communicatively coupled to the one or more memories, configured to:
  obtain user information relating to a user device or a user of the user device, the user device being in a communication session with another device;
  determine, after determining the user information, that the user device is placed on a hold status;
  determine, based on the user information, a set of media items to be presented to the user device; and
  provide information related to the set of media items to the user device via the communication session.

9. The device of claim 8, wherein the user information comprises one or more of:
  a name of the user,
  a username associated with the user,
  an account associate with the user,
  an identification string of the user,
  a media preference of the user,
  demographic information concerning the user, or
  information concerning one or more reasons for a communication request.

10. The device of claim 8, wherein the one or more processors, when obtaining the user information, are configured to:
  obtain the user information based on establishing the communication session with the user device.

11. The device of claim 8, wherein the information related to the set of media items comprises:
  a message identifying one or more media items of the set of media items for the user to select.

12. The device of claim 8, wherein the one or more processors are further configured to:
  obtain a response regarding the information related to the set of media items; and
  perform an action regarding the set of media items based on the response regarding the information related to the set of media items.

13. The device of claim 8, wherein the one or more processors are further configured to:
  determine a period of hold time associated with the hold status; and
  determine the set of media items based on a respective run-time of one or more items of the set of media items that have a run-time that correlates with the hold time.

14. The device of claim 8, wherein the one or more processors are further configured to:
  determine, based on the user information, one or more of:
    a media preference,
    a media type preference,
    a media genre preference, or
    a media item preference; and
  wherein the one or more processors, when determining the set of media items, are configured to:
    determine the set of media items based on the one or more of the media preference, the media type preference, the media genre preference, or the media item preference.

15. A non-transitory computer-readable medium storing instructions, the instructions comprising:
  one or more instructions that, when executed by one or more processors, cause the one or more processors to:
    obtain user information relating to a user device or a user of the user device, the user device being in a communication session with another device;
    determine, after determining the user information, that the user device is placed on a hold status;
    determine, based on the user information, a set of media items to be presented to the user device; and
    provide information related to the set of media items to the user device via the communication session.

16. The non-transitory computer-readable medium of claim 15, wherein the user information comprises one or more of:
  a name of the user,
  a username associated with the user,
  an account associate with the user,
  an identification string of the user,
  a media preference of the user,
  demographic information concerning the user, or
  information concerning one or more reasons for a communication request.

17. The non-transitory computer-readable medium of claim 15, wherein the one or more instructions, that cause the one or more processors to obtain the user information, cause the one or more processors to:
  obtain the user information based on establishing the communication session with the user device.

18. The non-transitory computer-readable medium of claim 15, wherein the information related to the set of media items comprises:
  a message identifying one or more media items of the set of media items for the user to select.

19. The non-transitory computer-readable medium of claim 15, wherein the one or more instructions, when executed by the one or more processors, further cause the one or more processors to:
  obtain a response regarding the information related to the set of media items; and
  perform an action regarding the set of media items based on the response regarding the information related to the set of media items.

20. The non-transitory computer-readable medium of claim 15, wherein the one or more instructions, when executed by the one or more processors, further cause the one or more processors to:
  determine a period of hold time associated with the hold status; and
  determine the set of media items based on a respective run-time of one or more items of the set of media items that have a run-time that correlates with the hold time.

\* \* \* \* \*